United States Patent [19]

Rock

[11] 4,437,295
[45] Mar. 20, 1984

[54] AUTOMATIC HEADER HEIGHT CONTROL

[75] Inventor: Merlin A. Rock, Bettendorf, Iowa

[73] Assignee: International Harvester Co., Chicago, Ill.

[21] Appl. No.: 252,481

[22] Filed: Apr. 8, 1981

[51] Int. Cl.³ .............................................. A01D 75/28
[52] U.S. Cl. ....................................... 56/10.2; 56/208; 56/DIG. 15; 172/4; 318/599
[58] Field of Search ...................... 56/10.2, 17.1, 17.2, 56/214, 217, DIG. 10, DIG. 15, 208; 172/2, 4, 7, 9, 10, 11; 318/599, 587, 681

[56] References Cited

U.S. PATENT DOCUMENTS

| | | | |
|---|---|---|---|
| 3,487,458 | 12/1969 | Martens et al. | 318/599 |
| 3,874,407 | 4/1975 | Griswold | 318/599 |
| 4,064,945 | 12/1977 | Haney | 172/4 |
| 4,105,938 | 8/1978 | Mathews, Jr. | 318/599 |
| 4,136,508 | 1/1979 | Coleman et al. | 56/208 |
| 4,146,828 | 3/1979 | Ross et al. | 318/599 |
| 4,158,162 | 6/1979 | Hawkins | 318/599 |
| 4,288,730 | 9/1981 | Graham | 318/599 |

FOREIGN PATENT DOCUMENTS 2047437 11/1981 United Kingdom .................... 172/4

OTHER PUBLICATIONS

Timer Applications Sourcebook, with Experiments, (1978), by Howard M. Berlin, pp. 27–36.
Pulse, Digital, and Switching Waveforms, (1965), by Millman & Taub, pp. 404–450.

Primary Examiner—Gene Mancene
Assistant Examiner—James R. Hakomaki
Attorney, Agent, or Firm—Dennis K. Sullivan; F. David Aubuchon

[57] ABSTRACT

The method for automatically controlling the height of a header used with a farm implement comprises the steps of: sensing the height of the header above ground; selecting a desired height of the header above ground; determining any difference error between the selected height and the sensed height; determining the direction of the difference error, up or down; generating an electrical correction pulse having a duty cycle directly related to the amount of the difference error; supplying the electrical correction pulse to solenoid operated valving means to cause same to supply and/or relieve a pulse of pressurized fluid to a mechanism for raising or lowering the header; and repeating the above steps automatically and continuously to move the header in intermittent pulses toward the selected height, thereby automatically to control the height of the header above ground. The apparatus for carrying out the method comprises: a potentiometer for sensing the height of the header above ground, a potentiometer for selecting a desired height of the header above ground, and a multifunction electrical circuit coupled to the sensing potentiometer and the selecting potentiometer. The circuit is capable of (a) determining the difference error between the selected height and the sensed height, (b) determining the direction of the difference error, up or down, (c) generating an electrical correction pulse having a duty cycle directly related to the amount of difference error, (d) supplying the electrical correction pulse to the solenoid operated valving means to cause same to supply and/or relieve a pulse of pressurized fluid to the mechanism for raising or lowering the header and (e) repeatedly determining the difference error and direction of the difference error, and cyclically generating correction pulses and supplying the correction pulses to the solenoid operated valving means to move the header in intermittent pulses toward the selected height, thereby automatically to control the height of the header above ground.

24 Claims, 3 Drawing Figures

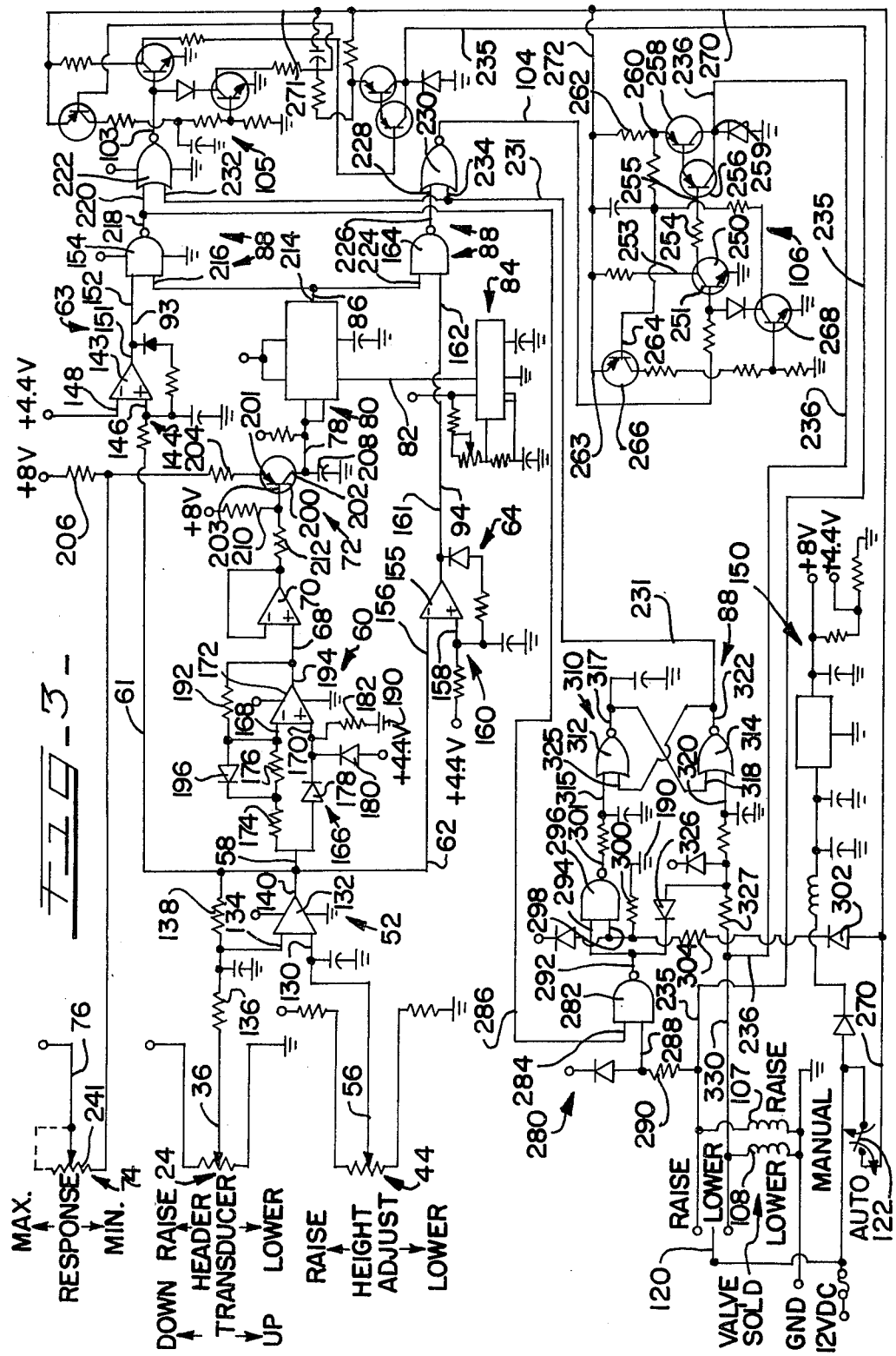

AUTOMATIC HEADER HEIGHT CONTROL

BACKGROUND OF THE INVENTION

1. Field of the Invention

The present invention relates to an automatic header height control system. More specifically, the present invention relates to a pulsing automatic header height control method and apparatus which provides for the supply or relief of correction pulses of pressurized hydraulic fluid to or from one end of a piston and cylinder mechanism operable to raise or lower the header, the duration of each pulse being related to the size of the error between the actual header height and the desired header height above ground.

2. Description of the Prior Art

Heretofore various automatic header height control systems have been proposed for controlling the height of a header above ground and for providing an automatic correction when the actual height of the header differs from a selected desired height. Examples of various header height control systems previously proposed are disclosed in the following U.S. patents:

U.S. Pat. No.
 3,623,301
 3,704,574
 3,722,193
 3,851,451
 3,886,718
 3,906,710
 3,908,345
 4,136,508

Particular reference is made to U.S. Pat. Nos. 3,704,574, 3,851,451 and 4,136,508.

U.S. Pat. No. 3,704,574 issued to S. H. Gardner on Dec. 5, 1972, for: COMBINE AUTOMATIC HEADER HEIGHT CONTROL discloses a mechanical system associated with header height sensors for moving a valve stem in or out, depending upon the movement of the header height sensor above or below a predetermined setting thereof.

U.S. Pat. No. 3,851,451 issued to J. B. Agness, et al. on Dec. 3, 1974, for: AUTOMATIC HEIGHT CONTROL SYSTEM FOR A CROP HARVESTER discloses an automatic height control system having a plurality of individually operable ground followers or height sensors operatively associated with switches which are electrically connected to a solenoid valve for controlling the vertical movement of a header of a crop-gathering unit.

U.S. Pat. No. 4,136,508 issued to M. W. Coleman, et al. on Jan. 30, 1979, for: CLOSED-LOOP COMBINE HEADER HEIGHT CONTROL discloses an automatic header height control for the crop-gathering header of a combine which permits the operator to change the desired height setting from the operator's platform without stopping the combine and to adjust the dead band within which the header can move from a height setting without generating a correction signal from the operator's platform and do so without stopping the combine. The dead bank adjust includes a potentiometer.

There is also disclosed in U.S. Pat. No. 3,736,486 a dead band control circuit in a servocontrol system for a digital servo-motor control and drive system which is particularly useful in controlling a servo-motor used in editing images in a motion picture film-to-videotape transfer system. The dead band control circuit includes an adjustable potentiometer whereby the dead band can be adjusted quite accurately merely by adjusting the wiper arm of the potentiometer.

As will be described in greater detail hereinafter, the automatic header height control system of the present invention provides a pulsing automatic header height control method and apparatus for effecting, incrementally in pulses, adjustment of the height of a header toward a desired, selected height, the duration of each correction pulse being related to the amount of deviation or error of the actual header height from the selected, desired header height. These pulses are generated electrically and transmlated to control duration pulses of pressurized hydraulic fluid which are delivered to an hydraulic mechanism for raising or lowering the header.

Heretofore, such a pulsing system for automatically controlling header height and providing correction dependent upon the amount of the error has not been proposed. However, there has heretofore been proposed in a non-analogous servo-control system for controlling the position of a butterfly-type valve element in an air duct having an air outlet to a room whose temperature is controlled by inputs from hot and cold air ducts, a regulated control system which provides for pulse duration modulated signals in the dead band zone. This REGULATED CONTROL SYSTEM is disclosed in U.S. Pat. No. 3,083,327, issued to R. C. Byloff on Mar. 26, 1963. In this system, at the edge of the modulated band, full power pulses are generated for moving a valve motor in a clockwise direction or in a counterclockwise direction to move a valve element.

This patent teaches that small error signals which normally would have little effect are utilized to provide control current pulses of full power and varying pulse duration to extend the circuit operation past and into the dead band zone. These control current pulses provide inching operation of the valve motor.

Within the dead band zone, the regulated control system provides full power pulses with varying duration depending upon the amount of error. Outside the dead band zone, the system also provides full power pulses having a duty cycle and/or frequency which are a function of the amplitude of an input, variable amplitude, error signal which is supplied as an input to magnetic amplifier circuits. As the magnitude of error increases, the full power pulses are either of longer duty cycle and/or of higher frequency, until at the edge of the modulation band, full and continuous power is applied to the valve motor. Besides magnetic amplifiers, the system of the Byloff patent includes time constant circuits for controlling the pulse intervals.

Although this patent teaches the concept of changing variable amplitude error signals to pulse duration modulated power pulses, such pulses can be varied in frequency and/or pulse width outside the dead band zone relative to the input error signal received.

In other words, this system starts at the edge of the modulated band with full power output which, as the error reduces, changes to variable duty cycle and/or variable frequency pulses, until the amplitude of the error signal is reduced to a level which places the system in the dead band zone where the variable amplitude input error signal continues to be changed to full power pulses of varying pulse duration, the duration being related to the amplitude of the input signal.

As will be disclosed in greater detail hereinafter, the pulsing automatic header height control method and apparatus of the present invention differ from the REGULATED CONTROL SYSTEM disclosed in the Byloff U.S. Pat. No. 3,083,327 by providing a very small dead band zone with no control within the dead band zone, by providing a system which is utilized for controlling the height of a header as opposed to a butterfly valve element in an air duct, by providing a simple, electronic system without the use of complicated magnetic amplifiers, and by providing for constant amplitude, variable duration pulses from the hysteresis/dead band through a programmed maximum error condition of 30° of potentiometer movement with no full D.C. power application and wherein the duration of each pulse is directly related to the amount of error sensed between the actual header height and the selected, desired header height.

SUMMARY OF THE INVENTION

According to the invention there is provided a method for automatically controlling the height of a header used with a farm implement, said method comprising the steps of: sensing the height of the header above ground; selecting a desired height of the header above ground, determining any difference error between the selected height and the sensed height; determining the direction of the difference error, up or down; generating an electrical correction pulse having a predetermined constant amplitude, a predetermined constant frequency, and a duty cycle directly related to the amount of the difference error; supplying the electrical correction pulse to solenoid operated valving means to cause same to supply and/or relieve a pulse of pressurized fluid to a mechanism for raising or lowering the header; and repeating the above steps automatically and continuously to move the header in intermittent pulses toward the selected height, thereby automatically to control the height of the header above ground.

Further according to the invention there is provided an automatic header height control apparatus for use with a header of a farm implement, the height of which header can be adjusted relative to the ground therebeneath, said apparatus comprising: means for sensing the height of the header above ground means for selecting a desired height of the header above ground; and multifunction electrical circuit means, coupled to said sensing means and said selecting means (a) for determining the difference error between the selected height and the sensed height, (b) for determining the direction of the difference error, up or down, (c) for generating an electrical correction pulse having a predetermined constant amplitude, a predetermined constant frequency, and a duty cycle directly related to the amount of difference error, (d) for supplying said electrical correction pulse to solenoid operated valving means to cause same to supply and/or relieve a pulse of pressurized fluid to a mechanism for raising or lowering the header and (e) for repeatedly determining the difference error and direction of the difference error, and cyclically generating correction pulses and supplying said correction pulses to the solenoid operated valving means to move the header in intermittent pulses toward the selected height, thereby automatically to control the height of the header above ground.

BRIEF DESCRIPTION OF THE DRAWINGS

FIG. 3 is a detailed schematic circuit diagram of the electrical circuit shown in FIG. 2.

DESCRIPTION OF THE PREFERRED EMBODIMENT

Figure 1:
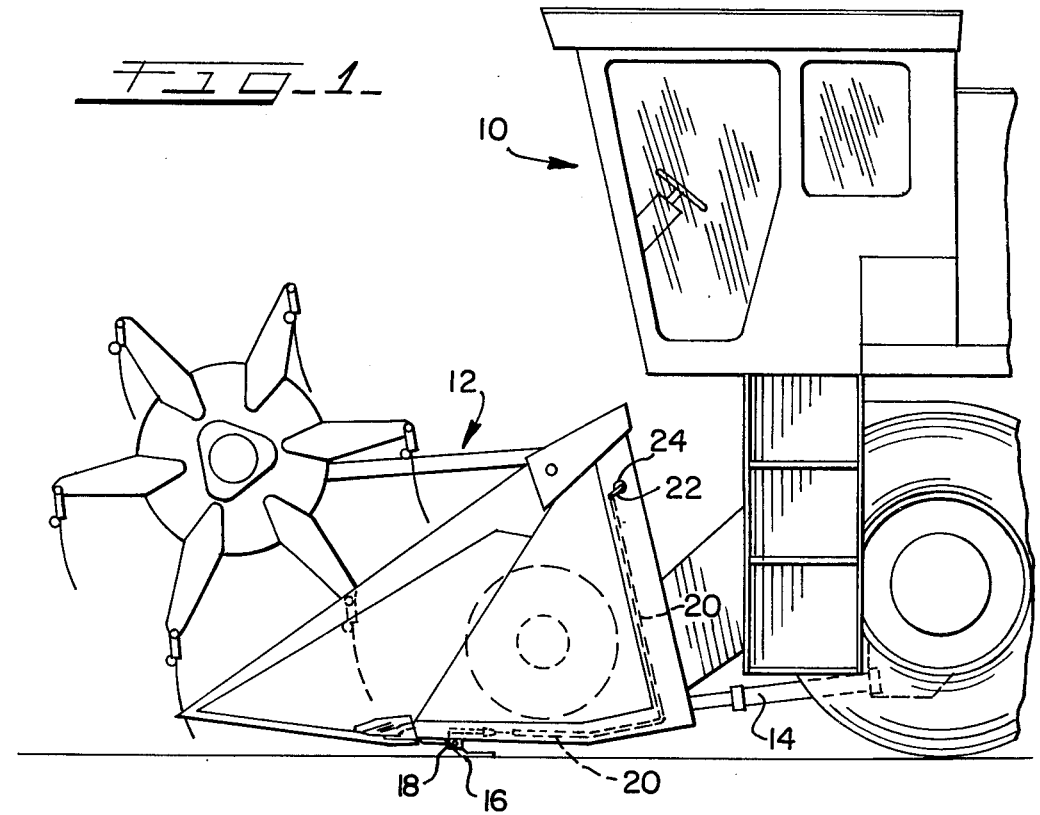
FIG. 1 is a vertical elevational view with portions broken away of the front end of a farm implement having a header, the height of which is controlled by the automatic header height control apparatus of the present invention.

There is shown in FIG. 1 a combine 10 having a crop harvesting header 12 pivotally mounted thereon. The header 12 is movable up and down by a pair of hydraulic cylinders one of which being shown at 14. The header 12 is equipped with a plurality of ground engaging fingers 16 disposed along the length of the header on a shaft 18. A control cable assembly 20 is connected to the shaft 18 and extends rearwardly and upwardly on the header into connection with an arm 22 of a rotary potentiometer 24. The above structure is conventional and functions to change the output of the potentiometer 24 as a function of the height of the header 12 above the ground during crop harvesting.

As will be described in greater detail hereinafter, the clockwise or counterclockwise position of the arm 22 of the potentiometer 24 controls the position of the cylinder 14 which will be operated to move the header 12 upwardly or downwardly, depending upon the difference between the header height sensed by the potentiometer 24 and a selected, desired height determined by the set resistance of a height adjust potentiometer 44 shown in FIG. 2.

Figure 2:
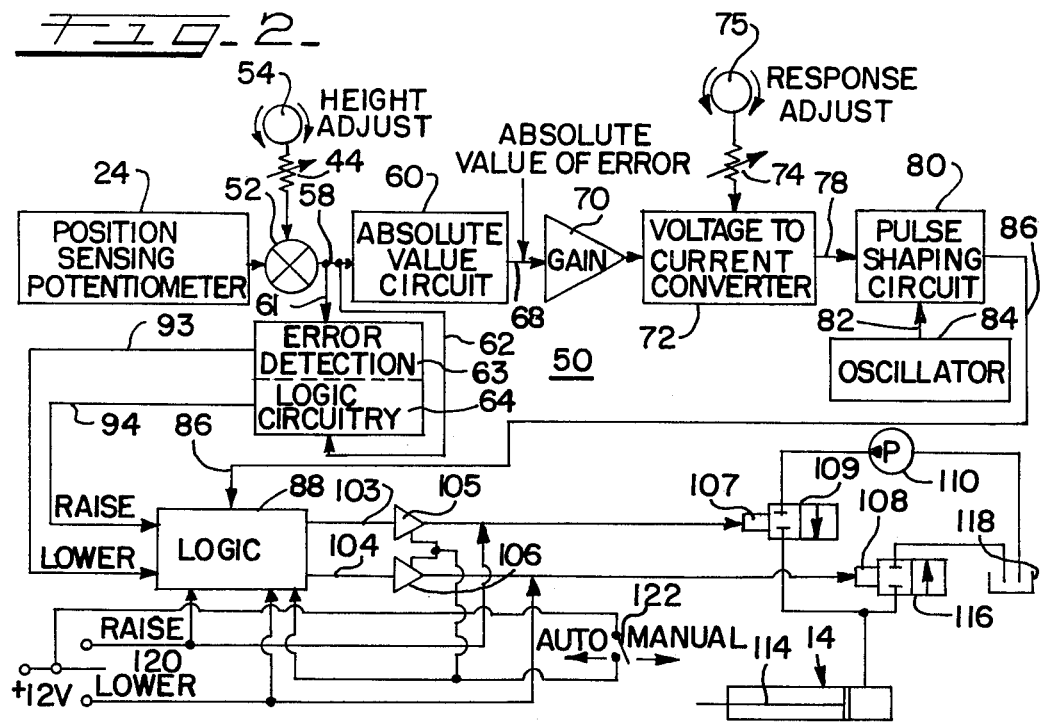
FIG. 2 is a schematic block diagram of the electrical circuit for the automatic header height control apparatus of the present invention.

Referring now to FIG. 2 there is illustrated therein a block circuit diagram 50 of the pulsing automatic header height control apparatus of the present invention. As shown, the ouput signal or voltage level from the header height sensing potentiometer 24 is supplied to a summing network 52 which also receives a voltage signal determined by the position of the height adjust potentiometer 44 located in the combine cab. This voltage signal is set by rotating a knob 54 connected to a wiper arm 56 (FIG. 3) of the height adjust potentiometer 44.

The output from the summing network 52 is supplied via a conductor 58 to an absolute value circuit 60 and via conductors 61 and 62 to error detection logic circuits 63 and 64. The absolute value of the error at the output of the absolute value circuit 60 is supplied via a conductor 68 to a buffer amplifying circuit 70, the output of which is supplied to a voltage-to-current converter circuit 72. This circuit 72 also receives an input from a "response adjust" potentiometer 74 having a "response adjust" knob 75 located in the combine cab, which knob 75 is connected to a wiper arm 76 (FIG. 3).

The output from the voltage-to-current converter circuit 72 is supplied via conductor 78 to a pulse shaping circuit 80 which also receives a clock signal via a conductor 82 from an oscillator 84. The output of the pulse shaping circuit 80 is supplied via a conductor 86 to raise/lower control logic 88 which also receives input via conductors 93 and 94 from the error direction logic circuits 63 and 64.

The control logic 88 has two outputs 103 and 104 coupled to solenoid driver circuits 105 and 106 which operate raise solenoid 107 and lower solenoid 108, respectively. Operation of the solenoid 107 causes opening of a valve 109 to supply pressurized fluid in a pulse from a pump 110 to the cylinder unit 14 to extend a piston rod 114 to raise the header 12. Operation of the solenoid 108 causes opening of a valve 116 to relieve fluid from the cylinder 14 to a sump 118 to allow retraction of the rod 114 under weight of the header 12 acting thereagainst to lower the header.

The above described hydraulic system is itself conventional in header lift systems for combines. In a practical embodiment the valves 109 and 116 are available in a valve unit manufactured by Control Concepts, Inc., under the designation Model Serial #570. Such a valve unit is similar to that shown in U.S. Pat. No. No. 4,202,250.

In the combine cab there is also provided a raise/lower switch 120 and an auto/manual switch 122. When the auto/manual switch 122 is in an open, manual position, the raise/lower switch 120 can be operated to manually operate the raise and lower solenoids 107 and 108. When the auto/manual switch 122 is in a closed "auto" position, movement of the raise/lower switch 120 to the "lower" position will enable the control logic 88 to place the apparatus 50 in the automatic mode of operation and movement to the "raise" position will override the "auto" mode to raise the header 12 as will be described in greater detail hereinafter.

Briefly, in the operation of the pulsing automatic header height control apparatus 50, a difference between the setting of the height adjust potentiometer 44 and the height sensing potentiometer 24 is determined by the summing network 52 which then supplies an error signal to the error direction logic circuits 63 and 64 and to the absolute value circuit 60 which, if the error is down, provides for a gain of approximately 1.0, and if it is up, provides for a gain of approximately 0.5, the lower gain of the signal to lower the header 10 being provided because of the weight of the header. Then, the signal is passed through the unity gain buffer circuit 70 which supplies the correction signal to the voltage-to-current converter circuit 70 where the amplitude of the error signal, amplified by the absolute value circuit 60, is utilized to control the amount of current flow as will be described in greater detail in connection with the description of FIG. 3.

This variable current flow is supplied to the pulse shaping circuit 80 which has an input from the oscillator circuit 84 of a 7 Hz clock signal which is a pulse occurring at approximately every 142 milliseconds. An output signal on the conductor 86 has this frequency of 7 Hz and has a constant amplitude. However, the width of the output pulse or duty cycle of the pulse is varied depending upon the amplitude of the error signal received and multiplied by the absolute value circuit 60. This signal is then supplied to the control logic 88 which also receives a signal on line 93 or 94 indicating whether a raise pulse or a lower pulse should be output from the control logic 88 on either the conductor 103 or the conductor 104. Then, the appropriate signal is applied to the appropriate driver circuit 105 or 106 to actuate one of the solenoids 107 or 108 to cause raising or lowering of the header 12. Of course, for this automatic operation, the switch 122 must be in a closed "auto" position.

Referring now to FIG. 3 in greater detail, there is illustrated therein a schematic circuit diagram of the pulsing automatic header height control apparatus 50. As shown, the circuit has three voltage inputs, the first being from the height adjust potentiometer 44, the second being from the height sensing potentiometer 24, and the third being from the response adjust potentiometer 74. Also, of course, there are the manual switch inputs to the apparatus 50, namely the raise/lower switch 120 and the auto/manual switch 122, which are located in the combine cab.

Once the desired height has been set by adjusting the wiper arm 56 of the potentiometer 44, the desired response of the circuit has been set by adjusting the position of the wiper 76 of the response adjust potentiometer 74, the switch 122 has been placed in the closed "auto" position and the raise/lower switch 120 has been pulsed to the lower position to enable the control logic 88, the apparatus 50 is now set to respond to movement of the wiper arm 36 on the potentiometer 24 connected to summing network 52 defined by comparator 132.

As shown, the wiper arm 56 is coupled to one input 130 of the comparator 132, the other input 134 of which is coupled through a resistor 136 to the wiper arm 36. A feedback resistor 138 is coupled between the input 134 and an output 140 of the comparator 132.

The output of the comparator 132 is supplied to the error direction logic circuits 63 and 64. The error direction logic circuit 63 is a comparator circuit including a comparator 143. In this respect, it will be noted that the conductor 61 is coupled through an RC circuit 144 to a plus input 146 of the comparator 143 which has another input 148 coupled to a plus 4.4 voltage source obtained from a conventional power supply 150 (at the bottom of the circuit diagram).

An output 151 from the comparator 143 is supplied via conductor 93 to one input 152 of a NAND circuit forming part of the control logic 88.

Similarly, the error detection logic control circuit 64 includes a comparator 155 having a minus input 156 connected to the output 140 of the comparator 132. A plus input 158 of the comparator 155 is coupled through an RC circuit 160 to the plus 4.4 voltage supply.

An output 161 from the comparator 155 is supplied via conductor 94 to one input 162 of another NAND circuit 164 forming part of the control logic 88.

As shown, the output 140 of the comparator 132 is also supplied to the absolute value circuit 60 and to an input circuit 166 having outputs coupled to a minus input 168 and a plus input 170 of a comparator/operational amplifier 172. The input circuit 166 includes resistors 174 and 176 coupled between the conductor 58 and the minus input 168. Also, a diode 178 is coupled between the conductor 58 and the plus input 170 and another diode 180 is coupled between the plus 4.4 voltage supply and the plus input 170. A resistor 182 is connected between the plus input 170 and system ground 190.

A feedback resistor 192 is coupled between an output 194 of the operational amplifier 172 and the minus input 168. Additionally, a shunting diode 196 is connected across the resistor 176.

The resistor 174 is 35K ohms, the resistor 176 is 56K ohms and the resistor 192 is 47K ohms.

At the quiescent operating point of the comparator/operational amplifier 132, the voltage at the input 134 equals the voltage at the input 130 and the voltage of the output 140 is 4.4 volts, which voltage is applied to the input circuit 166 of the comparator/operational amplifier 172. Then, when the header 12 goes down, the voltage at the input 134 goes up (raise) and the voltage at the output 140 goes up and this output voltage is applied to the input circuit 166 and through diode 178 to input 170. With the diodes 178, 180 and resistors 174, 176 and 192 connected as shown, the voltage at input 170 will follow the voltage at output 140. Since the operational amplifier/comparator 172 has a high impedance, there is no current flow through the diode 178 and the diode 180 is reverse biased such that the voltage at input 170 is substantially the same voltage at the output 140 and the voltage at input 168 will change in a positive direction until it matches the voltage at the input 170 which, in view of the feedback resistor 192, will cause the voltage at the output 194 to follow the voltage at the input 168 so that there is no current through the resistor 192. Accordingly, so long as there is a positive increasing signal at the output 140, the voltage at the output 194 will follow the voltage at the output 140 result- ing in a gain of 1.0 or unity.

When the header goes up, the voltage on the wiper arm 36 goes down (lower) and below the voltage on the wiper arm 56. This causes the voltage at the output 140 to go below 4.4 volts. Then the diode 178 is backbiased so that the plus 4.4 volts across the diode 180 is applied to the input 170. In this case, the voltage from the operational amplifier 132 will not affect the voltage at the input 170. The voltage at the input 168 will try to follow the voltage at the output 140. In order for the absolute value circuit 60 to reach equilibrium, the voltage at the output 194 will have to be high enough so that the voltage at the input 168 matches the voltage at the input 170. This will cause a current to flow through the resistor combination 174, 176 and 192 which will provide a gain relative to the resistances used, such gain being the value of the resistance of the resistor 192 over resistors 174 and 176 which amounts to 47/89 and which is a little more than one-half. Thus, when there is a correction to lower the header, the gain or amplification is approximately one-half. When there is a correction signal to raise, then the gain is about one. As noted above, this difference in gain for the generation of the raise and lower correction pulses is built into the circuit 60 to compensate for the gravitational forces, i.e., the weight of the header urging it downwardly.

However, when there is a large lower error, such that there is relatively large voltage drop across resistor 176, the diode 196 becomes conductive and resistor 176 is shorted out. As a result, for a short time, the amplification will be greater than one, namely the value of resistor 194 over resistor 174, which is 47/35. In other words, for large "lower" errors that are encountered resulting in a more negative signal, the current will go through the diode 196 rather than through resistor 176.

The voltage at the output 194 is supplied via conductor 68 to a buffer amplifier 70 which serves to isolate the operational amplifier/comparator 172 from the voltage-to-current converter circuit 72.

The voltage-to-current converter circuit 72 includes a transistor 200 having an emitter 201, collector 202 and base 203. The emitter 201 is connected through two resistors 204 and 206 to plus 8 volts. The collector 202 is coupled through capacitor 208 to system ground 190. Also forming part of the circuit 72 is a voltage divider network comprising resistors 210 and 212. The resistor 210 is connected between plus 8 volts and the base 203 of the transistor 200 and the resistor 212 is connected between the output of the buffer circuit 70 and the base 203.

The collector 202 of the transistor 200 is connected by conductor 78 to the pulse shaping circuit 80 which is one-half of an LM 556 integrated circuit. The other half of the LM 556 circuit is connected as shown to form the oscillator circuit 84 which supplies a clock signal via the conductor 82 at a frequency of 7 Hz to the pulse shaping circuit 80. This clock signal serves to cause the pulse shaping circuit 80 to short out and discharge the capacitor 208 on each clock pulse. In the meantime, the pulse shaping circuit 80 produces an output signal including a spike or pulse and then a low at an output 214 of the pulse shaping circuit 80 which is supplied to conductor 86. The spike or pulse exists while the capacitor 208 is charging and until it reaches ⅔ of the voltage developed thereon. Thus, if the capacitor charges quickly, the spike is very short.

The transistor 200 operates as a throttling valve which throttles the current that is charging the capacitor 208. In this respect, the transistor 200 needs a 7/10 volt drop across the emitter (201) base (203) junction for conduction. At the quiescent state with 4.4 volts at the output of amplifier 70 and resistor 210 being 100 ohms and resistor 212 being 390 ohms, the base (203) voltage is 7.27 volts with the emitter 201 connected through resistors 204 and 206 to plus 8 volts. As the error voltage goes above 4.4, the base voltage goes up reducing the voltage across the emitter (201) base (203) junction thereby reducing conduction of transistor 200 causing capacitor 208 to take longer to charge up to ⅔ of the voltage developed thereon which causes the spike to become and output current pulse at output 214 having a duration dependent upon the magnitude of the error voltage signal at base 203.

At the quiescent operating point, the capacitor 208 charges quickly and the output pulse at output 210 is a spike insufficient to affect valves 109 or 116. Also, neither NAND circuit 154 nor 164 is enabled, i.e., no error direction signal is generated so that whatever the duration of the spike, the output of the NAND circuits 154 and 164 is not changed.

When an error signal is produced at the output 140, such as a header raise signal caused by the header going down, the voltage at input 134 goes up, at output 140 goes up and at input 146 goes up. This causes the voltage at output 151 to go from normally low to high.

Going back to the operation of circuits 63 and 64 and control logic 88, the NAND circuit 154 has a normally low input at input 152 such that its output 218 is normally high. In other words, with a normally low voltage at the input 152, the output 218 thereof is normally high, irrespective of the output signal at output 214. This normally high signal at output 218 is supplied to an input 220 of a NOR circuit 222 such that the output thereof supplied to conductor 103 is normally low so as to disable the driver circuit 105 as will be described in greater detail hereinafter.

The output 214 from the pulse shaping circuit 80 is also coupled to another input 224 of the NAND circuit 164. Again, the output 161 is normally low so as to supply a normally low signal to the input 162 of the NAND circuit 164. This results in the NAND circuit 164 having a normally high signal at its output 226 which is supplied to an input 228 of another NOR circuit 230. With a normally high signal at the input 228, the output of the NOR circuit 230 supplied to conductor 104 is normally low and this normally low signal disables the driver circuit 106.

As will be described in greater detail hereinafter, a conductor 231 from the control logic 88 has a normally high voltage signal thereon when the manual/auto switch 122 is in the open "manual" position and has a normally low voltage signal thereon when the manual/auto switch 122 is in the closed "auto" position and the raise/lower switch 120 has been momentarily moved to the "lower" position thereof.

Assuming now that apparatus 50 is in the "auto" mode of operation, there is a normally low voltage on the conductor 231 which is supplied to another input 232 of the NOR circuit 222 and another input 234 of the NOR circuit 230. As a result, there is a high (input 220) and a low (input 232) supplied to the NOR circuit 22 resulting in a low at the output thereof supplied to conductor 103. Likewise, with a high (input 228) and a low (input 234) supplied to the NOR circuit 230, there is normally a low at the output thereof supplied to the conductor 104. In this way, the logic 88 is enabled for automatic operation by the low on conductor 231. However, as will be described in greater detail hereinafter, to change the signal from a high to a low on the conductor 231, an operator has to move the switch 120 momentarily to the "lower" position after the switch 122 has been closed.

In any event, returning to a description of the operation of the circuit so far described in the "auto" mode, it will be appreciated that for the driver circuit 105 to be operated, there must be an error direction signal from the height sensing potentiometer 24 indicating that the header has gone down, i.e., the wiper arm 36 has gone up to generate an increase in voltage supplied to the input 134. This increase in voltage is supplied to the comparator 143 to change the output 151 from a low to a high, which is supplied to the NAND circuit 154. At the same time, the output pulse at the output 214 of the pulse shaping circuit 80 is changed from a spike followed by a normally low to a pulse having a width or duration related to the magnitude of the error. As a result, with a high at the input 152, when the pulse at the output 214 is supplied to the input 216, there are two highs supplied to the NAND circuit 154 to change the voltage at the output 218 from a high to a low. This results in two lows being supplied (on inputs 220 and 232) to the NOR circuit 222 to change the output thereof on conductor 103 from a low to a high to energize the driver circuit 105 at least for the duration or width of the output pulse supplied to the input 216 from the output 214 of the pulse shaping circuit 80. The driver circuit 105 then supplies a signal on an output conductor 235 to the raise solenoid 107.

Likewise, when the header goes up to generate a "lower" signal by moving the wiper arm 36 downwardly to cause a reduction in the voltage at the input 134, the output from the comparator 161 is changed from a low to a high and this is supplied to the input 162 of the NAND circuit 164. Then, when the correction signal having a width (duration) related to the amount of error is generated at the output 214 of the pulse shaping circuit 80, this pulse is passed through the NAND circuit 164 to change the output thereof for the duration of the error correction pulse at the output 226 from a high to a low which is supplied to the input 228 of the NOR circuit 230 which also is receiving a steady low (with the control logic 88 in the "auto" mode of operation) via the conductor 231. Two lows supplied to the NOR circuit 230 change the output thereof from a low to a high which is supplied to the conductor 104 to energize the driver circuit 106 which in turn supplies a signal on an output conductor 236 to the lower solenoid 108 to energize the lower solenoid 108.

The width of the output pulse of the output 214 can also be adjusted by the response adjust potentiometer 74 which includes a resistance element 241 which is connected in parallel with the resistor 206 and which can be shorted out so as to short out the resistor 206. This will, of course, decrease the resistance in series with the capacitor 208 to allow more current to flow from plus eight volts to system ground 190 through capacitor 208 to charge it faster to decrease the width of the the output pulse at output 214 and placing all the resistance of element 241 in parallel with resistor 206 will increase the width of the output pulse at output 214.

From the foregoing description it will be understood that when the control logic 88 is set in the "auto" mode of operation, and the potentiometers 44 and 74 have been set with a desired setting thereon, the system is ready to cause automatic raising and lowering of the header depending upon whether a down or up movement of the header has been sensed by the potentiometer 24. This is done cyclically at a rate of 7 Hz. In other words, during each cycle at 7 cycles/second, a correction pulse will be generated if there is a difference in the voltages supplied from the potentiometers 24 and 44. Each correction pulse will generate a correction power pulse having a variable duty cycle, i.e., width of the high, constant amplitude portion of the pulse to the low portion of the pulse, on either the output conductor 235 or 236, to energize the raise solenoid 107 or lower solenoid 108. When so energized, the solenoid 107 or 108 will operate the valve 109 or 116 that will supply or relieve a short burst or pulse of hydraulic fluid to or from the cylinder unit 14 for causing an incremental or pulse movement of the header up or down as determined by the error sensed by the sensing potentiometer.

Although the apparatus 50 could be designed so that there is an almost instantaneous response by the circuit, an instantaneous response is unstable and would cause "hunting" in the electrical circuit and render the electrical circuit susceptible to noise. Accordingly, a small hysteresis or dead band is designed into the apparatus 50. Such hysteresis/dead band is also inherent in the system in light of the tolerances and slippage of the mechanical parts of the apparatus 50 and the response characteristics of the electrical components of the electrical circuit.

In one preferred embodiment, a dead band/hysteresis of approximately 1 degree of movement up or down is provided in the sensing potentiometer 24. This translates to a movement of approximately 1/5 of an inch of the fingers 16 up or down. In other words, the finger 16 has to move 1/5 of an inch up or down before there is a response by the comparator 132. This means that there is approximately 2 degrees of non-adjustable hysteresis/dead band designed in one preferred embodiment of the apparatus 50. This one degree of movement up or down translates into 29.63 millivolts in either direction or a non-adjustable hysteresis/dead band of 2/5 inch of movement in which fingers 16 can move before there is an output signal generated at the output 140 of the comparator 132, i.e., 59.8 millivolts of non-adjustable hysteresis/dead band in sensing potentiometer 24.

Since driver circuits 105 and 106 are substantially identical, only the driver circuit 106 will be described in detail, it being understood that the driver circuit 105 has identical components and operates in an identical manner.

The driver circuit 106 is supplied with a control signal from the output of the NOR circuit 230 on conductor 104. Normally the output of the NOR circuit 230 is low to shut off the driver circuit 106. The driver circuit 106 includes a control transistor 250 and, when a high voltage is supplied to base 251 of transistor 250, as a result of the normally low output from the NOR circuit 230 going to a high, the transistor 250 conducts and a collector 253 thereof goes from a high to a low and this low is supplied through a resistor 254 to base 255 of a transistor 256 connected with another transistor 258 as part of a Darlington pair. Transistor 258 is a power transistor and when it is turned on, the current through collector 259 there is supplied via the output conductor 236 connected thereto to the "lower" solenoid 108.

Whenever the current through the transistor 258 becomes large enough to cause damage to the transistor 258, there is a voltage drop across a 0.1 ohm resistor 262 which establishes a voltage across an emitter (263) base (264) junction of a transistor 266 causing the transistor 266 to conduct. Such conduction of transistor 266 supplies a voltage to the base of a transistor 268 to turn on transistor 268 which causes a drop in voltage at the base 251 thereby to turn off the transistor 250 which in turn causes the transistors 256 and 258 to turn off.

As shown, the driver circuits 105 and 106 are energized by the closing of the switch 122 which connects a 12 volt source to a conductor 270 which supplies voltage to each of the driver circuits via conductors 271 and 272.

As shown, part of the control logic 88 is positioned at the bottom left hand corner of FIG. 3 and includes enable/inhibit circuitry 280. The enable/inhibit circuitry 280 includes a NAND circuit 282 having one input 284 that is coupled by a conductor 286 to the output 218 from the NAND circuit 154 and which has a normally high voltage signal thereon. Another input 288 to the NAND circuit 282 is coupled through a resistor 290 to the output conductor 235 from the driver circuit 105 and is normally low until the driver circuit 105 is energized or the switch 120 is pulsed to the "raise" position. With a normally high and a normally low input to the NAND circuit 282, the output 292 thereof is normally high. As shown, the high at output 292 is coupled to one input 294 of another NAND circuit 296 which has another input 298 which is normally low in the "manual" mode in view of the connection of the input 298 through resistor 300 to system ground 190 so that in the "manual" mode, output 301 of NAND circuit 296 is high. However, when the switch 122 is closed and in the "auto" position, 12 volts is coupled via the conductor 270 through a diode 302 and resistor 304 to the input 298 to put a high voltage signal thereon so that there are then two high inputs (294 and 298) to NAND circuit 296 causing output 301 to go low.

The enable/inhibit circuitry 280 further includes a flip-flop 310 comprising NOR circuits 312 and 314 which operate as follows. When the manual/auto switch 122 is closed, output 301 of NAND circuit 296 changes from high to low. This low is imposed on an input 315 of the NOR circuit 312 which has at this point in time a low at output 317 of the NOR circuit 312. This low is supplied to an input 318 of the NOR circuit 314 which has a low at its other input 320 from the conductor 236. This results in a high at output 322 of the NOR circuit 314. Thus we now have input 315 high, output 317 low and fed back into input 318 making it low, input 320 low, and output 322 high which is fed back into another input 325 of NOR circuit 312.

At this point, to enable the enable/inhibit circuitry 280, an operator must pulse momentarily the switch 120 to the "lower" position where 12 volts is connected to a conductor 330 coupled to the input 320 to place a high thereon. With a momentary high on 320, and a high on the input 318, the output 322 from the NOR circuit 314 changes from a high to a low. In this respect, pulsing of the switch 120 to the lower position results in "flipping" the flip-flop 310, the result of which is to change output 322 from high to low which is connected to input 325 to change it from high to low. A low at 325 and a low at 315 change output 317 from low to high. Output 317 is connected to input 318 to change it from low to high. Then, with a high on input 318 and a high or low on input 320, output 322 remains low to enable NOR circuits 222 and 230. In this respect, the low at output 322 is carried by conductor 231 to the NOR circuits 230 and 222 to enable same.

Thus, movement of the switch 120 momentarily to the "lower" position is required after closing the switch 122 to place the enable/inhibit circuitry 280 in the enable condition. Also, it will be noted that when the switch 120 is moved to the "raise" position to pulse raise solenoid 107, this supplies a high voltage to the input 288 which together with the high input to the circuit 282 results in changing the output from a normal high to a low at the output 292 and this low applied to the input 294 of the NAND circuit 296 causes the output 301 thereof to change from a low to a high which will "flip" the flip-flop 310 back to its inhibit state where there is a high at the output 322 on the conductor 231. As a result, the switch 120 must be pulsed to "lower" again to again enable the circuitry 280. This is important since when the operator pulses the switch 120 to the "raise" position to raise the header to go over an obstacle, the control logic 88 is disabled to prevent automatic operation of the apparatus 50 until the switch 120 is pulsed to the "lower" position again.

Also, if switch 120 is pulsed to "raise" and the apparatus 50 is in the "auto" mode and performing a "lower" cycle of operation, the high on input 288 together with the high on input 284 forces output 292 low which allows diode 326 to conduct to cause a voltage drop across a resistor 327 to pull input 320 of NOR circuit 314 low (which would otherwise go high) so that as the output 301 from NAND circuit 296 goes from low to high it can "flip" flip-flop 310 thereby to inhibit the enable/inhibit circuitry 280 to allow the operator to override the "auto" mode and raise the header without any delay.

From the foregoing description it will be apparent that the apparatus 50 of the present invention has a number of advantages, some of which have been described above and others of which are inherent in the invention. Accordingly, the scope of the invention is only to be limited as necessitated by the accompanying claims.

What is claimed is:

1. A method for automatically controlling the height of a header used with a farm implement, said method comprising the steps of: continuously sensing the height of the header above ground; selecting a desired height of the header above ground; continuously determining any difference error between the selected height and the sensed height; determining the direction of the difference error, up or down; continuously generating a train of electrical correction pulses at a predetermined constant frequency, each electrical correction pulse of said train of pulses having a predetermined constant amplitude and a duty cycle directly related to the amount of the difference error; supplying the electrical correction pulses to solenoid operated valving means to cause same to supply and/or relieve a pulse of pressurized fluid to a mechanism for raising or lowering the header for each electrical correction pulse received; and repeating the above steps automatically and continuously to move the header in intermittent pulses toward the selected height, thereby automatically to control the height of the header above ground.

2. The method according to claim 1 wherein said step of generating a correction pulse includes the step of generating, for an up correction difference error, a pulse having an amplification of 1.0 times the difference error and, for a down correction difference error, a correction pulse of 0.5 times the difference error.

3. The method according to claim 1 including the step of adjusting the speed of response by adjusting the width of the correction pulse relative to the difference error determined.

4. The method according to claim 1, wherein said step of generating an electrical correction pulse includes the step of controlling the charging current through a capacitor which is periodically discharged by a timing circuit and wherein, when the capacitor has charged to a certain value, the output from the timing circuit goes from a normally low to a normally high level to generate the electrical correction pulse having a variable duty cycle.

5. The method according to claim 4, wherein said timing circuit is operated at 7 Hz to cause repetition of said steps at a frequency of 7 Hz.

6. The method according to claim 1, wherein said steps are repeated at a frequency of approximately 7 Hz.

7. An automatic header height control apparatus for use with a header of a farm implement, the height of which header can be adjusted relative to the ground therebeneath, said apparatus comprising: means for continuously sensing the height of the header above ground; means for selecting a desired height of the header above ground; and multifunction electrical circuit means, coupled to said sensing means and said selecting means (a) for continuously determining any difference error between the selected height and the sensed height, (b) for determining the direction of the difference error, up or down, (c) for continuously generating a train of electrical correction pulses at a predetermined constant frequency, each electrical correction pulse of said train of pulses having a constant amplitude and a duty cycle directly related to the amount of difference error, (d) for supplying said electrical correction pulses to solenoid operated valving means to cause same to supply and/or relieve a pulse of pressurized fluid to a mechanism for raising or lowering the header for each electrical correction pulse received and (e) for repeatedly determining the difference error and direction of the difference error, and cyclically generating correction pulses and supplying said correction pulses to the solenoid operated valving means to move the header in intermittent pulses toward the selected height, thereby automatically to control the height of the header above ground.

8. The apparatus according to claim 7, wherein said means for sensing the height of the header include a first adjustable impedance and a first movable element in contact with said first impedance and movable with the header and wherein said means for selecting a desired height include a second adjustable impedance and a second movable element in contact with said impedance, and said multifunction electrical circuit means include comparator means having one input coupled to said first movable element associated with the header and another input coupled to said second movable element in contact with said second adjustable impedance for selecting a desired height.

9. The apparatus according to claim 7, wherein said multi-function electrical circuit means include direction determining circuit means for determining the error direction of movement of the header, up or down, and for generating a lower control signal or a raise control signal.

10. The apparatus according to claim 7, wherein said multi-function electrical circuit means include pulse generating means for generating said electrical correction pulse having a duty cycle directly related to the amount of the difference error, said pulse generating means including capacitor charging circuit means including a capacitor and a semiconductor throttling element in series therewith and having a gate responsive to the difference error for controlling the charging current through the semiconductor throttling element into the capacitor, and timing circuit means coupled to said capacitor and operable to cyclically discharge said capacitor upon each cycle of a predetermined frequency of operation of said timing circuit, said timing circuit having an output which has a duty cycle dependent upon the charging rate of said capacitor, the output signal from said output of said timing circuit being high while said capacitor is charging and until said capacitor charges to a certain value and then being low for the remainder of the cycle such that the width of the output pulse so generated, when the output from the timing circuit is high, is dependent upon the charging rate of said capacitor.

11. The apparatus according to claim 10, wherein said multifunction electrical circuit means include direction determining means for determining the error direction of movement of the header, up or down, and for generating a lower control signal or a raise control signal, gating circuit means having inputs coupled to said direction determining circuit means and to said output from said timing circuit, and first and second solenoid driver circuits coupled between the output of said gating circuit means and first and second solenoids of said solenoid operated valve, said gating circuit means being operable upon receiving a raise or lower control signal and said correction pulse to pass said correction pulse to said first or second solenoid driver circuit to cause a raise pulse or a lower pulse to be supplied to said solenoid operated valving means for raising and lowering the header.

12. The apparatus according to claim 7, wherein said means for sensing the height of the header include a first adjustable impedance and a first movable element in contact with said first impedance and movable with the header, said means for selecting a desired height include a second adjustable impedance and a second movable element in contact with said impedance, and said multifunction electrical circuit means include comparator means having one input coupled to said first movable element associated with the header and another input coupled to said second movable element in contact with said second adjustable impedance for selecting a desired height, direction determining circuit means coupled to the output of said comparator means for determining the error direction of movement of the header, up or down, and for generating a lower control signal or a raise control signal, and pulse generating means for generating said electrical correction pulse having a duty cycle directly related to the amount of the difference error, said pulse generating means including capacitor charging circuit means including a capacitor and a semiconductor throttling element in series therewith and having a gate responsive to the difference error for controlling the charging current through the semiconductor throttling element into the capacitor, and timing circuit means coupled to said capacitor and operable to cyclically discharge said capacitor upon each cycle of a predetermined frequency of operation of said timing circuit, said timing circuit having an output which has a duty cycle dependent upon the charging rate of said capacitor, the output signal from said output of said timing circuit being high while said capacitor is charging and until said capacitor charges to a certain value and then being low for the remainder of the cycle such that the width of the output pulse so generated, when the output from the timing circuit is high, is dependent upon the charging rate of said capacitor and wherein said multifunction electrical circuit means further include gating circuit means having inputs coupled to said direction determining circuit means and to said output from said timing circuit, and first and second solenoid driver circuits coupled between the output of said gating circuit means and first and second solenoids of said solenoid operated valve, said gating circuit means being operable upon receiving a raise or lower control signal and said correction pulse to pass said correction pulse to said first or second solenoid driver circuit to cause a raise pulse or a lower pulse to be supplied to said solenoid operated valving means for raising and lowering the header.

13. The apparatus according to claim 12, including coupling means for coupling the output of said comparator to the gate of said throttling semiconductor element, said coupling means including amplifier means operable to amplify the correction signal from the output of said comparator by a factor of approximately 1.0 when the correction is to raise the header and by a factor of approximately 0.5 when the correction is in the direction to lower the header.

14. The apparatus according to claim 13, including buffer circuit means coupled between the output of said amplifier and the gate of said throttling element.

15. The apparatus according to claim 13, wherein said amplifier means include feedback circuit means operable when the correction signal supplied thereto is for lowering the header, said feedback circuit means including shunting means for shunting part of the feedback circuit when the correction error is large to change the correction factor from approximately 0.5 to approximately 1.3 until the amount of the correction error signal is such as to reduce the voltage across the shunting means below the actuating voltage level therefor.

16. The apparatus according to claim 9, wherein said capacitor charging circuit includes resistance means, said capacitor and said throttling semiconductor which is a transistor having its emitter and collector (or source and drain) in series with said resistance means and said capacitor and having its base coupled to the output of a comparing means which generated a difference error signal when the sensed height is different than the selected height.

17. The apparatus according to claim 16, wherein said resistance means include first and second resistors, and wherein said apparatus further includes response adjusting means including an adjustable resistance connected across said first resistor and having a movable element for adjusting the resistance value of said adjustable resistance thereby to control the value of the capacitor charging current.

18. The apparatus according to claim 12, wherein said gating circuit means include a first comparator having a minus input and a plus input with the minus input being coupled to a reference voltage and the plus input being coupled to the output of said comparator means of said multifunction electrical circuit means, a first NAND gate, the output from said first comparator being coupled to an input of said first NAND gate, a second comparator having a minus input coupled to the output of said comparator means of said multifunction electrical circuit means and a plus input coupled to a reference voltage and a second NAND gate, the output of said second comparator being coupled to said second NAND gate.

19. The apparatus according to claim 18, wherein said first NAND gate has an output coupled to said first driver circuit for operating a first solenoid of the solenoid operated valve and said second NAND gate has an output coupled to said second driver circuit for operating a second solenoid coupled to said solenoid operated valving means.

20. The apparatus according to claim 11, wherein said timing circuit means is driven by an oscillator circuit means coupled thereto.

21. The apparatus according to claim 20, wherein said oscillator circuit means is operable to drive said timing circuit means at a frequency of 7 Hz.

22. The apparatus according to claim 11, including a RAISE/LOWER valve solenoid switch for energizing a raise solenoid of said valve when said switch is in a "RAISE" position and for energizing a lower solenoid of said valve when said switch is in a "LOWER" position and a MANUAL/AUTO single pole, single throw switch for placing the apparatus in manual operation or automatic operation, the open position of said MANUAL/AUTO switch being the "MANUAL" position where said driver circuits for said first and second solenoids of said solenoid operated valving means are deenergized and the closed position of said switch being the "AUTO" position where said driver circuits are energized.

23. The apparatus according to claim 19, including a RAISE/LOWER valve solenoid switch for energizing a raise solenoid of said valve when said switch is in a "RAISE" position and for energizing a lower solenoid of said valve when said switch is in a "LOWER" position and a MANUAL/AUTO single pole, single throw switch for placing the apparatus in manual operation or automatic operation, the open position of said MANUAL/AUTO switch being the "MANUAL" position where said driver circuits for said first and second solenoids of said solenoid operated valving means are deenergized and the closed position of said switch being the "AUTO" position where said driver circuits are energized.

24. The apparatus according to claim 23, wherein said first and second driver circuits include first and second NOR gates each having an input coupled to a respective one of said first and second NAND gates, and wherein said apparatus further includes control circuit means coupled to said first and second solenoids, to inputs to said NOR gates and to said MANUAL/AUTO switch which, when closed, couples said driver circuits with a voltage source, said control circuit means being operable to enable said NOR gates when said MANUAL/AUTO switch is closed and said RAISE/LOWER switch is momentarily moved to the LOWER position and operable to disable said NOR gates when moved to said RAISE position so that when an operator manually raises the header (such as for going over an obstacle) by moving the RAISE/LOWER switch to the RAISE position, said apparatus is prevented from automatically lowering the header until the operator momentarily moves the RAISE/LOWER switch to the LOWER position.

* * * * *